(12) United States Patent
Baba et al.

(10) Patent No.: US 7,635,756 B2
(45) Date of Patent: Dec. 22, 2009

(54) SOYBEAN 7S PROTEIN AND PROCESS FOR PRODUCING THE SAME

(75) Inventors: Toshimitsu Baba, Minato-ku (JP); Ken Ishida, Osaka (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 11/447,968

(22) Filed: Jun. 7, 2006

(65) Prior Publication Data

US 2006/0223985 A1      Oct. 5, 2006

Related U.S. Application Data

(63) Continuation-in-part of application No. PCT/JP2004/018553, filed on Dec. 13, 2004.

(30) Foreign Application Priority Data

Dec. 11, 2003    (JP) .............................. 2003-413136

(51) Int. Cl.
*A61K 36/48* (2006.01)
*A23J 1/14* (2006.01)
(52) U.S. Cl. .................. 530/378; 530/412; 424/757; 426/656
(58) Field of Classification Search ................ 435/68.1; 530/370, 378, 412; 424/757; 426/656
See application file for complete search history.

(56) References Cited

U.S. PATENT DOCUMENTS

2005/0164337 A1 *   7/2005   Duranti et al. .............. 435/68.1

FOREIGN PATENT DOCUMENTS

| JP | 61-236795 | 10/1986 |
|----|-----------|---------|
| JP | 10-262619 | 10/1998 |
| JP | 11-18687 | 1/1999 |
| JP | 2002-262838 | 9/2002 |

OTHER PUBLICATIONS

Thanh, V.H., et al. 1975 Plant Physiology 56: 19-22.*
Keizo Ishino et al., "Gelation Phenomena Induced by Alkali-alcohol Treatment of 7S and 11S Components in Soybean Globulins", Agric. Biol. Chem., vol. 41, No. 8, pp. 1347-1352, 1977.

* cited by examiner

*Primary Examiner*—Maryam Monshipouri
*Assistant Examiner*—Marsha M Tsay
(74) *Attorney, Agent, or Firm*—Wenderoth, Lind & Ponack, L.L.P.

(57) ABSTRACT

It is intended to improve the water-dispersibility of a soybean 7S protein isolate, which is rich in soybean 7S globulin as compared with a conventional soybean protein isolate, to thereby provide a beverage thereof easy to drink or ameliorate the workability thereof in producing processed food products such as dough products and tablets. The improved soybean 7S protein isolate having high water-dispersibility can be obtained by treating a soybean 7S protein fraction with an aqueous ethanol solution and drying the same followed by, if necessary, grinding or controlling the grain size. Further, the viscosity of an aqueous dispersion of the above protein isolate can be lowered by acidifying the same.

5 Claims, No Drawings

SOYBEAN 7S PROTEIN AND PROCESS FOR PRODUCING THE SAME

CROSS REFERENCE

The present application is a continuation-in-part application of PCT/JP2004/018553, filed Dec. 13, 2004.

TECHNICAL FIELD

The present invention relates to a process for producing a soybean 7S protein isolate having improved water-dispersibility, and the resulting soybean 7S protein isolate.

BACKGROUND ART

Soybeans and soybean processed food products are important protein sources in the diet, and various components thereof are known to have biological regulatory functions. 7S Globulin is an important constituent component of soybean protein, but has been found that its content in soybean protein is low. According to general knowledge, soybeans contain 7S and 11S globulins in the ratio of 1:2. In addition to these globulins, it has been reported that oil-body-associated protein is also present in soybeans and its content amounts to about 35% by weight of industrially produced soybean protein isolate (SAMOTO, Biosci. Biotechnol. Bioche, Vol. 62, No. 5, 935-940, 1988). This indicates that 7S globulin does not exceed one-third of soybean protein.

It has also been reported that soybean 7S globulin has a reducing function of serum triglycerides (OKITA, J. Nutr. Sci. Vitaminol., 27, 379-388, 1981; and AOYAMA, Biosci. Biotechnol. Bioche, Vol. 65, No. 5, 1071-1075, 2001). High levels of serum triglycerides cause hyperlipemia and even arteriosclerosis, which results in cerebral and cardiovascular diseases. Therefore, the reduction of serum triglycerides is of great significance.

With the diversification of the diet, consumption of animal food is increasing and the intake balance between animal food and vegetable food is disrupting. It is thus not always easy to take 7S globulin from general foodstuffs at an amount of 5 g or more, which is an effective amount for reducing serum triglycerides (KAMBARA, Therapeutic, Research, vol. 23, no. 1, 85-89, 2002).

It is very useful if soybean 7S globulin can be readily taken in the form of a powder beverage prepared by mixing the globulin with water or the like.

However, since a protein isolate which is rich in soybean 7S globulin (hereinafter referred to as soybean 7S protein isolate) has remarkably high viscosity and high hydration properties, its powder forms undissolved lumps when mixed with a liquid such as water. In addition, undissolved lumps once formed are very difficult to disperse and require strong stirring to break them, which preclude the convenient and simple intake of soybean 7S protein. These physical properties of a soybean 7S protein isolate also result in poor workability when used in water-containing dough, and less easiness to eat when used in chewable tablets or the like.

DISCLOSURE OF THE INVENTION

An object of the present invention is to improve physical properties of a soybean 7S protein isolate so that it can readily disperse in an aqueous medium such as water, thereby permitting the convenient and simple intake and utilization of soybean 7S globulin.

The present inventors have intensively studied to improve dispersibility of a soybean 7S protein isolate in liquids such as water, and found out that the treatment of a soybean 7S protein fraction with an aqueous ethanol solution significantly improves its dispersibility in liquids. Further, they have found that, when pH of a product is adjusted, viscosity during dispersion can be lowered, thereby providing an improved soybean 7S protein-containing product that can be easy to take and utilize.

That is, the present invention provides:

(1) A process for producing an improved soybean 7S protein isolate which comprises treating a soybean 7S protein fraction with an aqueous ethanol solution;

(2) The process according to the above (1), wherein the soybean 7S protein fraction is a soybean protein fraction whose 7S globulin purity is 40% by weight or more;

(3) The process according to the above (1), wherein the aqueous ethanol solution contains 30% by weight to 95% by weight of ethanol based on the total weight thereof;

(4) The process according to the above (1), wherein the aqueous ethanol solution is added in an amount of 15 parts by weight or more per 100 parts of the soybean 7S protein fraction;

(5) The process according to the above (1), wherein an aqueous dispersion containing 5% by weight of the improved soybean 7S protein isolate has a pH of not higher than 6.8; and (6) An improved soybean 7S protein isolate whenever produced by the process according to the above (1).

BEST MODE FOR CARRYING OUT THE INVENTION

The soybean 7S protein fraction used in the present invention can be obtained by known methods. That is, there are a method utilizing the difference in isoelectric points (JP 55-14457 A), a method utilizing the difference in reactivity with calcium (JP 48-56843 A), a method utilizing the difference in the solubility due to pH and ionic strength (JP 49-31843 A), a method isolating 7S globulin from 11S globulin by adjusting slurry obtained by isoelectric precipitation to pH 5.0 to 5.6, and adjusting sodium chloride concentration to 0.01 to 0.2 M (JP 58-36345 A), and a method utilizing so-called cryoprecipitation phenomenon and a reducing agent (JP 61-187755 A).

Further, the isolation of protein from 11S globulin-deficient bred soybeans, i.e., 7S globulin-rich seeds (Breeding Science, 46, 11, 1996) has been studied to obtain protein rich in 7S globulin and such a method can also be used. 7S Globulin is composed of three subunits α, α', and β. 7S Globulin of the present invention may lack a part of the subunits. Among subunits α, α'and β, the amount of 7S globulin herein used means the total amounts of these subunits present therein.

In the present invention, the soybean 7S protein fraction may be that prepared by any of the above methods, preferably that prepared according to a method, wherein 7S globulin of high purity can be isolated from defatted soybeans (SAITO, Biosci. Biotechnol. Bioche. Vol. 65, No. 4, 884-887, 2001).

In the present invention, the soybean 7S protein fraction refers to that isolated by any of the above methods and contains more 7S globulin than a conventional soybean protein isolate. That is, the soybean 7S protein fraction refers to a soybean 7S protein fraction whose 7S globulin purity is 40% by weight or more, preferably 60% by weight or more, more preferably 80% by weight or more, further more preferably 85% by weight or more, and most preferably 90% by weight or more.

The present invention is characterized by the treatment of the soybean 7S protein fraction with an aqueous ethanol solution. For example, in case that the soybean 7S protein fraction is a powdery product, the treatment is carried out by wetting the product with an aqueous ethanol solution and, during or after wetting, drying a wetted product by heat or air. The resulting product can be used as it is or after particle size controlling or grinding as the soybean 7S protein isolate of the present invention.

The wetting method of the soybean 7S protein fraction with an aqueous ethanol solution is not specifically limited as long as the fraction is uniformly wetted by the solution. By mixing ethanol and water beforehand, the soybean 7S protein fraction is readily and uniformly treated. The treatment of the soybean 7S protein fraction with an aqueous ethanol solution is carried out, for example, by slowly adding an aqueous ethanol solution to the soybean 7S protein fraction to wet it while stirring in a stirrer or a shearing machine, or by spraying an aqueous ethanol solution to all over the surface of the soybean 7S protein fraction with an atomizer.

The ethanol concentration of the aqueous ethanol solution used for treating the soybean 7S protein fraction influences on the physical properties of the resulting soybean 7S protein isolate. If the ethanol concentration of the aqueous ethanol solution is too low, the solution is less effective for improving the wettability of the resulting soybean 7S protein isolate by water. Further, when the aqueous ethanol solution is added, hard undissolved lumps of the soybean 7S protein fraction are apt to be formed, which results in the difficulty in uniform dispersion of the soybean 7S protein fraction therein. This adversely affects on workability. If the ethanol concentration is too high, the aqueous ethanol solution is also less effective for improving the wettability of the resulting soybean 7S protein isolate by water. The range of the optimum concentration of the aqueous ethanol solution somewhat varies depending upon a particular method for treating the soybean 7S protein fraction with the solution. For example, when the protein fraction is treated by a conventional mixing granulation method, the ethanol concentration of the aqueous ethanol solution can be in the range of 30% by weight to 95% by weight. Within this range, the water-dispersibility of the resulting soybean 7S protein isolate is improved. If the ethanol concentration of the aqueous ethanol solution is less than the above lower limit, undissolved lumps are formed during the treatment, which causes somewhat hardening of the resulting soybean 7S protein isolate after drying, and may result in a rough mouthfeel upon dispersion of the isolate in water. However, such problems can be readily solved by grinding the soybean 7S protein isolate after drying. Such a problem can be prevent more effectively by adjusting the ethanol concentration of an aqueous ethanol solution to, preferably, 50% by weight to 85% by weight, more preferably, 60% by weight to 85% by weight based on the total weight of the solution.

In case that the soybean 7S protein fraction is a powdery product, preferably not less than 15 parts by weight, more preferably not less than 30 parts by weight of the aqueous ethanol solution is required per 100 parts by weight of the soybean 7S protein fraction. The upper limit of the amount of the aqueous ethanol solution to be added is not specifically limited, but preferably up to 80 parts by weight, more preferably up to 70 parts by weight in view of the efficiency of drying and the environment. If the amount is less than 15 parts by weight, the solution is less effective for improving the dispersibility of the resulting soybean 7S protein isolate.

Further, by lowering of a pH of the resulting soybean 7S protein isolate, the viscosity of an aqueous dispersion thereof can be reduced and such an isolate is more preferred. The viscosity is significantly reduced by adjusting a pH of an aqueous 5% by weight dispersion of the resulting soybean 7S protein isolate to 6.8 or lower. As the pH is lowered, the viscosity can be more reduced. However, at the same time, when the pH becomes 6.0 or lower, sometimes, a strong acidic taste is developed. Then, desirably, the pH is appropriately adjusted by taking an acidic taste and applications of the soybean 7S protein isolate into consideration. In this case, when the soybean 7S protein fraction has been already acidic, it can be treated with the aqueous ethanol solution without further processing. When the soybean 7S protein fraction is not acidic, it can be treated with the aqueous ethanol solution in combination with an acid. The acid is not specifically limited as long as it can be used in food, and examples of the acid include organic acids such as citric acid, lactic acid, acetic acid, tartaric acid, phosphoric acid or a combination thereof. The amount of the acid to be added varies depending upon a particular kind of the acid, but preferably, the acid can be used in such an amount that the pH of an aqueous 5% by weight dispersion of the soybean 7S protein isolate is 6.8 or lower.

After or during the treatment of the soybean 7S protein fraction with the aqueous ethanol solution, water and ethanol are removed by drying. The drying method is not specifically limited and, for example, the drying is carried out with a batch-wise or continuous hot air dryer, or a conventional mixing granulation method.

After drying, where hard grains or masses are formed, preferably, grinding is carried out. The grinding method is not specifically limited and, for example, the grinding is carried out with a grinder mill.

If necessary, particle size controlling can be carried out, when the soybean 7S protein isolate having a selected particle size or a smaller particle size is desired. The particle size controlling is carried out with, for example, a size selector or a sieve. Further, the particle size controlling tends to reduce the viscosity, and this tendency is more remarkable when particle size is smaller. However, since the soybean 7S protein isolate having larger particle size has more superior water-dispersibility, the optimum size control conditions are determined by the balance between the dispersibility and viscosity. In general, the viscosity is not so high when the soybean 7S protein isolate is used at lower concentrations (e.g. used for powder beverages). Then relatively larger particle size, for example, about 10 to 80-mesh, is suitable in view of good dispersibility. On the other hand, when the soybean 7S protein isolate is used at higher concentrations, smaller particles, preferably smaller than 80-mesh, are suitable to reduce the viscosity.

The soybean 7S protein isolate of the present invention can be used by processing it into commercially available powder beverages such as protein powder, powder soups and powder drinks.

For powder beverages, the protein isolate may be processed in combination with other ingredients to improve palatability. Known ingredients used in conventional powder beverages can be freely used, and examples of the ingredients include saccharides, juice powders, milk powders, vegetable powders, green tea powders, cacao powder, coffee powder, sweeteners, starch, salts, flavors, seasonings, and the like. The protein isolate can also be used in dough products manufactured using water-containing dough, and powder-processed products such as tablets.

Hereinafter the analytical methods employed in the present invention will be illustrated.

SDS-polyacrylamide electrophoresis: According to the method by Laemmli (Nature, 227, 680, 1970), electrophoresis was carried out on a gradient gel at a gel concentration of 10 to 20%. The protein was applied in an amount of 5 μg.

Phytic acid: Phytic acid was determined according to the method by Alii Mohamed (Cereal Chemistry, 63, 475-478 1986).

Purity (SPE basis): The electrophoresis pattern obtained by the above SDS-polyacrylamide electrophoresis was measured in terms of an area using a densitometer, and the area ratio of the β-conglycinin fraction to the total protein area was determined as the purity (SPE basis). The content of β-conglycinin corresponds to the total amounts of α, α', and β subunits.

Although the purity can also be determined from the correction purity by taking the amount of coexisting oil-body-associated protein (described above) into consideration, the purity of β-conglycinin protein used herein is that determined by the SPE basis.

Dispersibility: To 100 ml of water was added 3 g of the soybean 7S protein isolate, the mixture was stirred slowly with a spoon, and the time taken for complete dispersion was measured. The time within 30 seconds was evaluated as "very favorable", within 60 seconds was "favorable", and over 60 seconds was "unfavorable".

EXAMPLES

The following Production Examples, Examples and Comparative Examples further illustrate the present invention in detail, but are not to be construed to limit the scope of the present invention. All parts and percents in these Examples are by weight unless otherwise stated.

Production Example 1

Preparation of Soybean 7S Protein Fraction

Extraction water at a temperature 40° C. was added to defatted soybeans in the weight ratio of 1:10, and the mixture was adjusted to pH 5.3 with hydrochloric acid. To the mixture was added phytase (Phytase Novo, manufactured by Novozymes A/S) in an amount of 8 units per protein, and the mixture was reacted at 40° C. for 30 minutes to obtain an enzyme-treated extraction slurry. The enzyme-treated extraction slurry was cooled to 25° C., adjusted to pH 6.1, and centrifuged at 3000 G. The resulting soluble fraction was adjusted to pH 4.9 with hydrochloric acid, and centrifuged to obtain precipitated curd. The precipitated curd was washed with 10-fold by volume of water, and 4-fold by weight of water was added thereto. The mixture was neutralized to pH 7.0 with sodium hydroxide. Then, the mixture was sterilized at 140° C. for 15 seconds, and spray-dried to obtain a soybean 7S protein fraction of high purity with a low phytic acid content (hereinafter referred to as T-a). Thus-obtained low-phytic acid 7S protein fraction (phytic acid content in solids: 0.05%) was subjected to SDS-polyacrylamide electrophoresis, and from the degree of staining of the stained protein bands, the purity of soybean 7S protein was determined to be 95%.

Preparation Example 2

Extraction water was added to defatted soybean in the weight ratio of 1:10 and the extraction was carried out at room temperature at pH 7.0 for 1 hour, followed by centrifugation to obtain defatted soybean milk. The defatted soybean milk was adjusted to pH 4.8 with hydrochloric acid, and warmed to 50° C. When the defatted soybean milk thus pH adjusted reached 50° C., the milk was immediately cooled to 30° C., and adjusted to pH 5.8 with sodium hydroxide, followed by centrifugation with a batch-wise centrifuge at 3000 G. The resulting soluble fraction was adjusted to pH 4.9 with hydrochloric acid, and centrifuged at 3000 G for 5 minutes to remove whey, thereby obtaining precipitated curd. To the precipitated curd was added 4-fold by weight of water was added, and the mixture was neutralized with sodium hydroxide, sterilized at 140° C. for 15 seconds, and spray-dried to obtain high-purity soybean 7S protein fraction (phytic acid content in solids: 1.90%) (hereinafter referred to as T-b). Thus-obtained soybean 7S protein fraction was subjected to SDS-polyacrylamide electrophoresis, and from the degree of staining of the stained protein bands, the purity was determined to be 95%.

Example 1

While stirring 100 parts of T-a with a Kenwood Mixer equipped with a whipper, 50 parts of an aqueous 80% ethanol solution was slowly added to T-a to thoroughly wet the fraction. The wetted powder was thinly spread on a tray, and dried it at 50° C. for 6 hours in an incubator equipped with a fan. After drying, the powder was passed through a 16-mesh sieve for size controlling to obtain the desired soybean 7S protein isolate. For evaluation, 3 g of the soybean 7S protein isolate was added to 100 ml of water, followed by slowly stirring with a spoon for 30 seconds. As a result, the powder showed good wettability and very favorable dispersibility in water.

Example 2

According to the same manner as that in Example 1, to 100 parts of T-a was added 20 parts of an aqueous 80% ethanol solution to obtain the desired soybean 7S protein isolate. For evaluation, 3 g of the soybean 7S protein isolate was added to 100 ml of water, followed by slowly stirring with a spoon for 60 seconds. As a result, the powder showed good wettability and favorable dispersibility in water.

Example 3

According to the same manner as that in Example 1, to 100 parts of T-a was added 50 parts of an aqueous 90% ethanol solution to obtain the desired soybean 7S protein isolate. For evaluation, 3 g of the soybean 7S protein isolate was added to 100 ml of water, followed by slowly stirring with a spoon for 60 seconds. As a result, the powder showed good wettability and favorable dispersibility in water.

Example 4

While stirring 100 parts of T-a with a tabletop food processor, 50 parts of an aqueous 70% ethanol solution was slowly added to T-a to thoroughly wet the fraction. The wetted powder was thinly spread on a tray, and dried at 60° C. for 4 hours in an incubator equipped with a fan. After drying, the powder was passed through a 16-mesh sieve for size controlling to obtain the desired soybean 7S protein isolate. For evaluation, 3 g of the soybean 7S protein isolate was added to 100 ml of water, followed by stirring slowly stirred with a spoon for 30 seconds. As a result, the powder showed good wettability and very favorable dispersibility in water.

Example 5

While stirring 100 parts of T-a with a tabletop food processor, 40 parts of an aqueous 50% ethanol solution was slowly added to T-a to thoroughly wet the fraction. The wetted powder was thinly spread on a tray, and dried at 60° C. for 4 hours in an incubator equipped with a fan. After drying, the powder was ground with a coffee mill, and passed through a 100-mesh sieve for size controlling to obtain the desired soybean 7S protein isolate. For evaluation, 3 g of the soybean 7S protein isolate was added to 100 ml of water, followed by slowly stirring with a spoon for 30 seconds. As a result, the powder showed very good wettability and very favorable dispersibility in water.

Example 6

According to the same manner as that in Example 1, to 100 parts of T-b was added 35 parts of an aqueous 80% ethanol solution to obtain the desired soybean 7S protein isolate. For evaluation, 3 g of the soybean 7S protein isolate was added to 100 ml of water, followed by slowly stirring with a spoon for 30 seconds. As a result, the powder showed good wettability and very favorable dispersibility in water.

Example 7

While stirring 100 parts of T-a with a Kenwood Mixer equipped with a whipper, 35 parts of an aqueous 80% ethanol solution was slowly added to T-a to thoroughly wet the fraction. The wetted powder was thinly spread on a tray, and dried at 60° C. for 4 hours in an incubator equipped with a fan. After drying, the powder was passed through a 100-mesh sieve for size controlling to obtain the desired soybean 7S protein isolate. For evaluation, 3 g of the soybean 7S protein isolate was added to 100 ml of water, followed by slowly stirring with a spoon for 60 seconds. As a result, the powder showed good wettability and favorable dispersibility in water.

Examples 8-10

According to the same manner as that in Example 7, to 100 parts of T-a was added a mixture of 35 parts of an aqueous 80% ethanol solution and 1 part, 0.88 part or 0.53 part of lactic acid to obtain the desired soybean 7S protein isolate. For evaluation, 3 g of each soybean 7S protein isolate was added to 100 ml of water, followed by slowly stirring with a spoon for 30 seconds. As a result, each powder showed good wettability and very favorable dispersibility in water.

Example 11

According to the same manner as that in Example 7, to 100 parts of T-a was added a mixture of 35 parts of an aqueous 80% ethanol solution and 1 part of acetic acid to obtain the desired soybean 7S protein isolate. For evaluation, 3 g of the soybean 7S protein isolate was added to 100 ml of water, followed by slowly stirring with a spoon for 30 seconds. As a result, the powder was good wettability and very favorable dispersibility in water.

To 95 g of water was added 5 g of each of the soybean 7S protein isolates obtained in Example 7-11 and the mixture was stirred with a spoon for 1 minute. Then, the viscosity was measured with a BM-type viscometer. Further, after thoroughly dispersing the mixture, pH of the dispersion was measured. The results are shown in Table 1.

TABLE 1

|  | Example 7 | Example 8 | Example 9 | Example 10 | Example 11 |
| --- | --- | --- | --- | --- | --- |
| Viscosity (cps) | 278 | 46 | 90 | 173 | 40 |
| pH | 7.1 | 6.4 | 6.7 | 6.9 | 6.3 |

Comparative Example 1

According to the same manner as that in Example 1, a soybean 7S protein isolate was prepared except that 10 parts of an aqueous 80% ethanol solution was added. For evaluation, 3 g of the soybean 7S protein isolate was added to 100 ml of water, followed by slowly stirred with a spoon for 60 seconds. As a result, many undissolved lumps were formed and a uniform dispersion was hardly obtained.

Comparative Example 2

According to the same manner as that in Example 1, a soybean 7S protein isolate was prepared except that 50 parts of absolute ethanol was added. For evaluation, 3 g of the soybean 7S protein isolate was added to 100 ml of water, followed by slowly stirred with a spoon for 60 seconds. As a result, the powder had poor wettability, many undissolved lumps were formed and a dispersion was hardly obtained.

Comparative Example 3

According to the same manner as that in Example 5, a soybean 7S protein isolate was prepared except that 35 parts of an aqueous 20% ethanol solution was added. However, the soybean 7S protein fraction became a massive mixture when the aqueous ethanol solution was added, which resulted in poor workability. For evaluation of dispersibility, 3 g of the soybean 7S protein isolate was added to 100 ml of water, followed by slowly stirred with a spoon for 60 seconds. As a result, the mixture showed poor wettability and a dispersion was hardly obtained.

Comparative Example 4

T-a was thinly spread on a tray, and allowed to stand at 60° C. for 4 hours in an incubator equipped with a fan. Then, the powder was passed through a 100-mesh sieve to obtain a soybean 7S protein isolate. For evaluation, 3 g of the soybean 7S protein isolate was added to 100 ml of water, followed by slowly stirring with a spoon for 30 seconds. As a result, the powder showed poor wettability, many undissolved lumps were formed and a dispersion was hardly obtained.

The compositions and the results of the dispersibility evaluation of the above Examples 1-11 and Comparative Examples 1-4 are summarized in Table 2.

TABLE 2

| | Example 1 | Example 2 | Example 3 | Example 4 | Example 5 | Example 6 | Example 7 | Example 8 |
|---|---|---|---|---|---|---|---|---|
| T-a | 100 parts | 100 parts | 100 parts | 100 parts | 100 parts | | 100 parts | 100 parts |
| T-b | | | | | | 100 parts | | |
| Aqueous ethanol solution (Concentration) | 80% | 80% | 90% | 70% | 50% | 80% | 80% | 80% |
| (Amount) | 50 parts | 20 parts | 50 parts | 50 parts | 40 parts | 35 parts | 35 parts | 35 parts |
| Lactic acid | | | | | | | | 1 part |
| Dispersibility | Very favorable | Favorable | Favorable | Very favorable | Very favorable | Very favorable | Favorable | Very favorable |

| | Example 9 | Example 10 | Example 11 | Comparative Example 1 | Comparative Example 2 | Comparative Example 3 | Comparative Example 4 |
|---|---|---|---|---|---|---|---|
| T-a | 100 parts | 100 parts | 100 parts | 100 parts | 100 parts | 100 parts | 100 parts |
| Aqueous ethanol solution (Concentration) | 80% | 80% | 80% | 80% | absolute | 20% | |
| (Amount) | 35 parts | 35 parts | 35 parts | 10 parts | 50 parts | 35 parts | |
| Lactic acid | 0.88 parts | 0.53 parts | | | | | |
| Acetic acid | | | 1 part | | | | |
| Dispersibility | Very favorable | Very favorable | Very favorable | Unfavorable | Unfavorable | Unfavorable | Unfavorable |

INDUSTRIAL APPLICABILITY

According to the present invention, it is possible to improve the water-dispersibility of a soybean 7S protein isolate, which is rich in soybean 7S globulin as compared with conventional soybean protein isolate, to thereby provide a beverage thereof easy to drink or ameliorate the workability thereof in producing processed food products such as dough products and tablets. Moreover, the viscosity of an aqueous dispersion of the above protein isolate can be lowered by acidification.

The invention claimed is:

1. A process for producing a soybean 7S protein isolate powder having improved water-dispersibility, which consists of adding or spraying an aqueous ethanol solution to a soybean 7S protein fraction powder whose 7S globulin purity is 40% by weight or more and drying the soybean 7S protein fraction powder.

2. The process according to claim 1, wherein the aqueous ethanol solution contains 30% by weight to 95% by weight of ethanol.

3. The process according to claim 1, wherein the aqueous ethanol solution is added or sprayed in an amount of 15 parts by weight or more per 100 parts of the soybean 7S protein fraction powder.

4. The process according to claim 1, wherein a pH of the soybean 7S protein fraction powder is adjusted so that an aqueous dispersion containing 5% by weight of the soybean 7S protein isolate powder having improved water-dispersibility has a pH of not higher than 6.8.

5. A soybean 7S protein isolate powder produced by the process according to claim 1.

* * * * *